July 16, 1946.  H. W. LINK  2,403,935
STORAGE MOTION FOLLOW-UP MECHANISM
Filed June 2, 1943   2 Sheets-Sheet 1

INVENTOR
Harry W. Link
BY
ATTORNEY

July 16, 1946.  H. W. LINK  2,403,935

STORAGE MOTION FOLLOW-UP MECHANISM

Filed June 2, 1943  2 Sheets-Sheet 2

INVENTOR
Harry W. Link
BY
ATTORNEY

Patented July 16, 1946

2,403,935

UNITED STATES PATENT OFFICE 2,403,935

STORAGE MOTION FOLLOW-UP MECHANISM

Harry W. Link, Merion, Pa., assignor to The Baldwin Locomotive Works, a corporation of Pennsylvania Application June 2, 1943, Serial No. 489,588

3 Claims. (Cl. 74—96)

This invention relates generally to an operating and follow-up mechanism for actuating the stroke of a hydraulic pump, slide valve or electric switch for controlling particularly the rudder movement of ships or for controlling other devices in those fields of application having similar problems.

In controlling a rudder it is desirable to allow the helmsman to rotate his trick wheel far in advance of rudder response thereby allowing the rudder to be thrown as quickly as possible to a hardover position. The ability to rotate the trick wheel in advance of rudder response is in the nature of storing motion which is later expended as the rudder responds. Heretofore storage motion devices have generally employed energy absorbing mechanisms such as springs that were required to be compressed by the helmsman upon rotation of the trick wheel. This not only involved mechanical complications but also appreciable effort to operate the mechanism against the storage force as well as other disadvantages well-known to those in the art.

One object of my invention is to provide an improved substantially energy free, storage motion device for maintaining operation of a motor until the stored motion is expended.

It is also an object to provide an improved storage control motion device whereby a trick wheel or other initiating source, may put motion into the control in any desired amount up to the full hardover amount in the case of steering apparatus, as fast as, or as far in advance of follow-up response of a power output device, as can be performed by an operator.

Another object is to provide an improved storage motion and follow-up control which, under normal conditions, functions to maintain or move the rudder to any position established by a given input movement such as from a trick or wheelhouse control against maximum designed torque generation and to maintain complete synchronization between the rudder movement and steering control means at all times.

A further object is to provide an improved storage motion and follow-up mechanism that is compact, foolproof and of rugged construction and whose operation is such as to eliminate the need for any delicate adjustments to avoid jamming due to wear or improper adjustment and which will minimize the effect of any progressive or cumulative lost motion during operation.

To accomplish the foregoing and other objects, I have provided in one specific aspect of the invention a springless rotary storage motion, planetary differential mechanism for initiating and controlling the stroke of a hydraulic pump which supplies operating fluid to the rudder motor. A trick wheel rotates one gear element of the planetary differential and a restoring connection from the rudder operates another gear thereof while a differential pinion operates a cam which is so shaped that after its initial rotation from neutral the cam and gearing can continue to rotate to store up motion without further affecting the pump adjustment until the stored up motion has been expended whereupon the restoring connection returns the pump to neutral. However, upon movement of the rudder in response to operating power applied thereto the restoring mechanism operates through the differential gear to return the pinion and cam to its neutral position. In this way trick wheel motion is effectively stored in the control device until expended through movement of the rudder to a position desired by the helmsman. A further result of my improved operating and follow-up control is that it may be used in conjunction with adjustable stops for limiting input turns from the trick wheel and accordingly limit rudder movement to a desired maximum right and left rudder, and moreover, the rudder may take complete charge to its hardover stops without injuring any portion of the follow-up gear through the response action. Hence, upon removal of the force that caused the rudder to take charge the steering gear automatically returns the rudder under power to its prior angle of setting, providing the helm or control input shaft has not been altered by the helmsman.

Other objects and advantages will be more apparent to those skilled in the art from the following description of the accompanying drawings in which.

Figure 3:
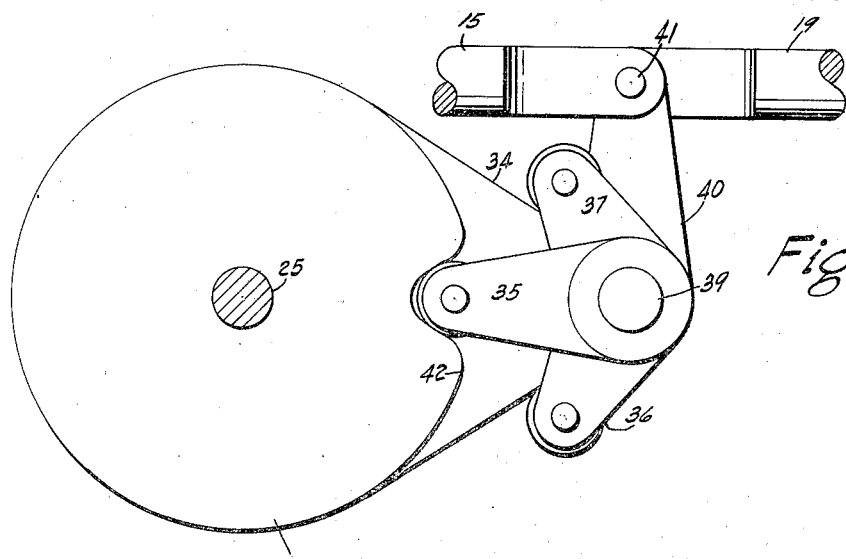
Figure 4:
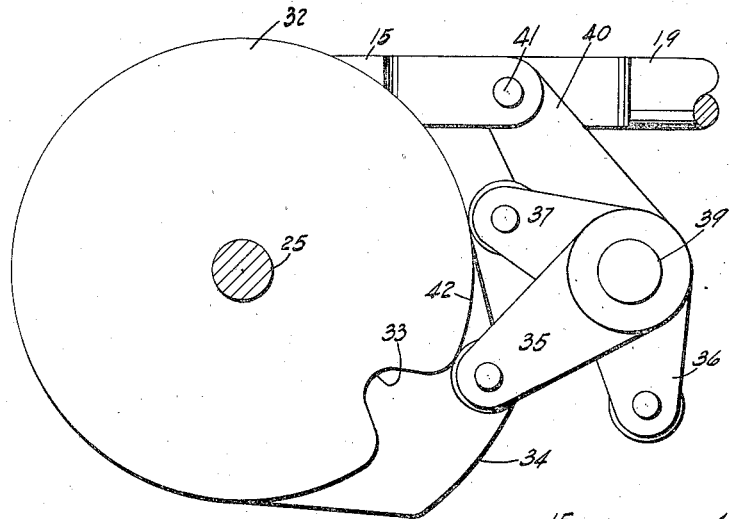
Figure 5:
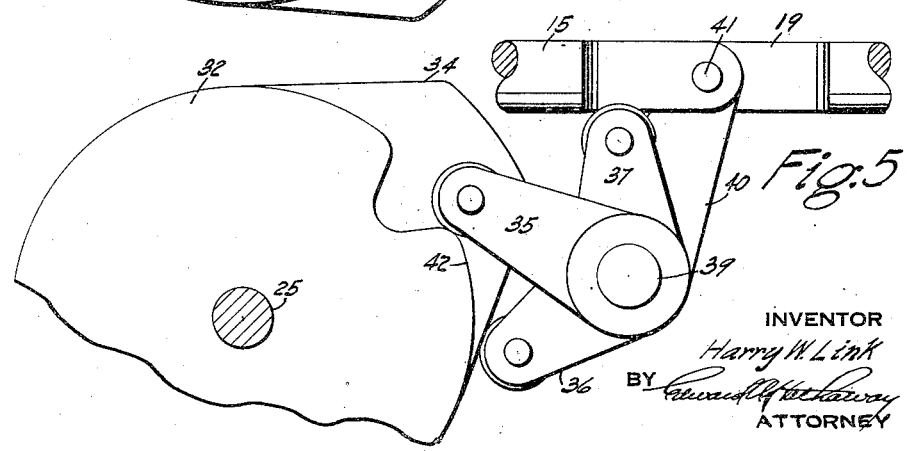

Figs. 3, 4, and 5 are diagrammatic outlines showing various operating positions of the control cams and cam followers.

In the specific aspect of the invention disclosed herein, I have shown for purposes of illustration a ship rudder 1 whose arm 2 is adapted to be angularly adjusted by a suitable connection to a motor, specifically a pair of rams and cylinders 3, 4, 5 and 6 adapted to be alternatively supplied with fluid from a reversible variable displacement pump generally indicated at 7 which may be of the Hele-Shaw or equivalent type pump. This pump is connected to cylinder 4 through a set of pipes 8 and to cylinder 6 through pipes 9 with a valve 10 interposed in these lines to permit the cylinders 4 and 6 to be shifted over to a reserve pump 11 similar to pump 7. To shift the operative pump to one side or the other of its neutral a trick wheel 12 operates an input shaft 13 which initiates actuation of the operating and follow-up mechanism generally indicated at 14. The mechanism 14 transmits its initiating movement through a rod 15 to shift pump 7 in a well-known manner in any desired direction thereby to supply fluid to one or the other of cylinders 4 or 6 and to discharge fluid from the other one thereof. When the rams 3 and 5 respond to the foregoing, a gear rack 16 suitably supported on and movable with rams 3 and 5 by a bracket 17 is adapted to rotate a shaft 18 through a rack pinion. Rotation of this shaft causes the restoring mechanism 14 to return pump 7 to its neutral position when the rudder has moved to the position desired by the helmsman.

It will be understood that the reserve pump 11 is connected to the restoring mechanism 12 through a rod 19 similar to rod 15, the pumps being respectively driven by their own continuously operating motors 20 and 21.

The trick wheel shaft 13 is connected to a pinion which operates gear 24 to rotate a shaft 25 suitably journalled in a housing 26, the shaft 25 being keyed to a sungear 27 which is connected by differential or planet pinions 28 to an internal ring gear 29. This internal gear, secured as an integral part of a gear 30, is freely journalled upon shaft 25 and meshes with a pinion 31 which is keyed to follow-up shaft 18. The planet gears 28 are suitably journalled on stub shafts secured in a cam disc 32 which in turn is journalled on shaft 25. This cam disc has, as shown in Figs. 3 to 5, a neutral cam notch 33 at one side and a cam lobe 34 at the other side, both arranged preferably symmetrically about a common median plane on the same side of shaft 25. A series of three cam follower arms 35, 36 and 37 angularly fixed with respect to each other are mounted upon a common shaft 39 and are adapted to actuate a pump shaft arm 40 connected to rods 15 and 19 through a suitable pivot connection 41. Suitable rollers on the arms provide a rolling contact between the arms and cam surfaces.

Figure 2:
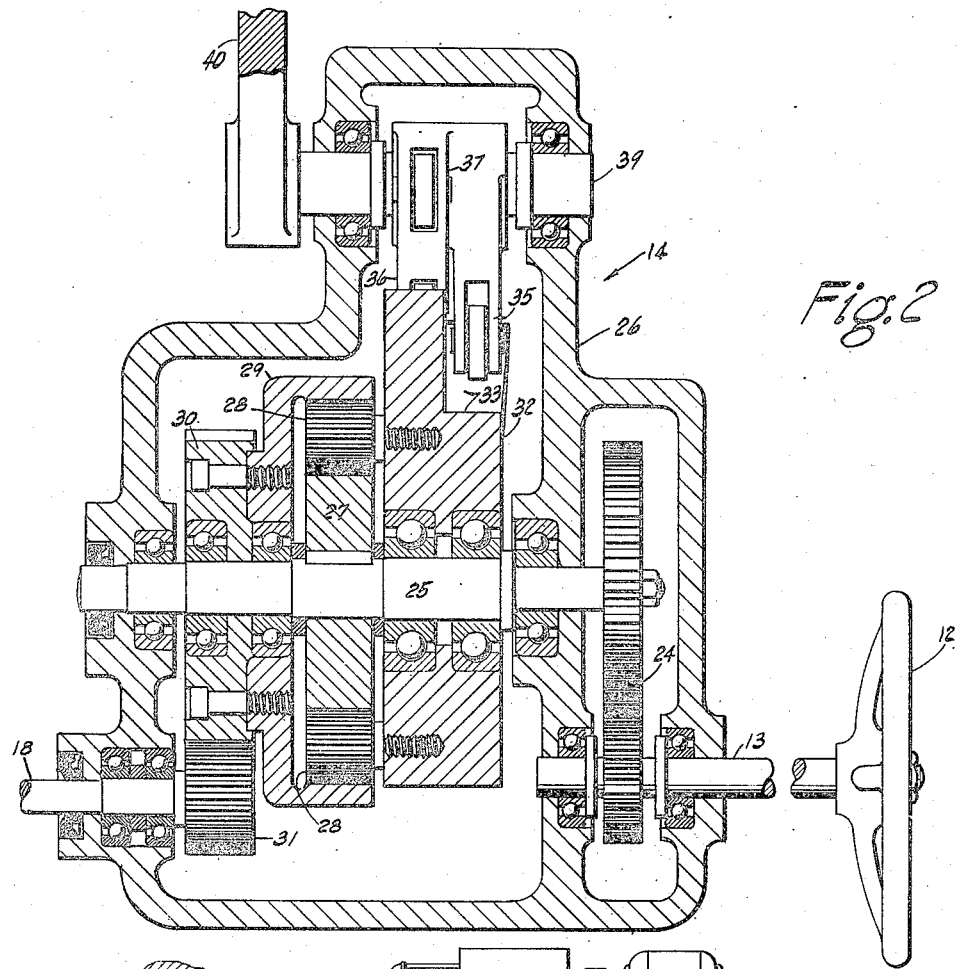
Fig. 2 is a horizontal sectional view through the mechanism.
Figure 1:
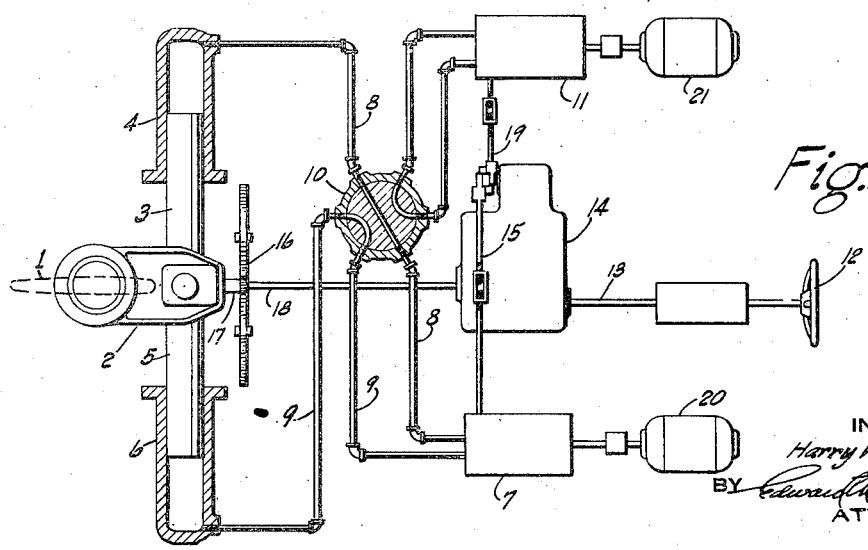
Fig. 1 is a diagrammatic outline of my improved operating and follow-up control embodied in a hydraulically operated rudder operating system.

In operation, it will be assumed that the pump 7 is in neutral position in which case the cam 32 is in the position of Fig. 3. The helmsman may then operate trick wheel 12 in either direction thereby rotating sun gear 27 and planet gears 28 and accordingly rotating cam disc 32 to cause arm 35, Fig. 4, to be moved out of neutral notch 33 and ride upon the periphery 42 of the cam disc. Simultaneously arm 37 is swung downwardly so that it rides upon the circular periphery of cam disc 32. The inclined side surfaces of the notch and lobe constitute means for initiating supply of fluid from the pump to the rudder motor. With both arms 35 and 37 riding upon the cam periphery 42, it is seen that no further angular movement of these two arms or shaft 39 can take place and accordingly even though trick wheel 12 is thrown to its hardover position still the disc 32 will merely freely continuously rotate until wheel 12 engages any suitable limit stop (not shown). Such free motion does not require any increase of input energy except to overcome friction or in other words the rotation is in response to a substantially constant input force. Rotation of shaft 39 causes arm 40 to shift pump 7 to such a position that ram 3 or 5 is suitably actuated by fluid supplied to cylinder 4 or 6 as the case may be, the other cylinder discharging back to the pump. As the rudder swings over, gear rack 16 will cause rotation of restoring shaft 18 which, as shown in Fig. 2, will rotate gear 30 and internal gear 29 and accordingly move planet gears 28 in a reverse direction around sun gear 27 and thereby restore cam disc 32 to its neutral position as shown in Fig. 3 with a corresponding adjustment of pump 7 back to its neutral position. The circular cam surface requires only a minimum restoring force, just sufficient to overcome friction. This is the reverse of the storage motion operation which requires only such energy input as to overcome friction. When the trick wheel is moved in the opposite direction the same sequence of operations as above described occur but with the cam disc rotated in the opposite direction as shown in Fig. 5 in which case arms 35 and 36 engage the periphery 42 to shift the pump and lock it in its reverse direction until restored to neutral by restoring shaft 18. Here again the trick wheel 12 may be thrown hardover to its other extreme position without in any way imposing excessive strains on the operating mechanism 14.

During return of the cams to neutral, the inclined cam surfaces 34 cause one or the other of arms 36 or 37, depending upon the direction of cam rotation, to move arm 35 into notch 33. It will also be noted that in all positions of the arms, there are at least two arms in contact simultaneously with the cams and the points of contact are on each side of a line intersecting the axes of shafts 25 and 39. This contact on both sides of such line positively controls rotation of the arms in opposite directions and in fact locks the arms aaginst any movement when they have been moved to the positions of Figs. 4 and 5.

From the foregoing disclosure it is seen that I have provided an extremely simple, rugged, compact and yet highly effective and foolproof storage motion, follow-up control mechanism. My improved mechanism does not involve any interrupted gears and moreover the rudder may take complete charge so as to move to its usual hardover stops without injuring any portion of the follow-up gear through response action thereof and in addition the rudder will return automatically to its position set by the helmsman when the force that caused the rudder to take charge is removed. Also, the helmsman can operate his control from the wheelhouse to the full hardover amount far in advance of the follow-up response or as fast as the operator may desire without any possibility of injury to the operating mechanism thereby providing a motion storage operation that is expended in accordance with the rate at which the operating rams are able to produce rudder movement.

It will of course be understood that various changes in details of construction and arrangement of parts may be made by those skilled in the art without departing from the spirit of the invention as set forth in the appended claims.

I claim:

1. A control mechanism having a plurality of oscillatable cams, a pair of arms respectively engageable with said cams, one of said cams and arms having a neutral position and arranged so as to angularly shift the arms away from their neutral position upon adjustment of the cams, the cam surfaces having provision whereby upon further rotation of the cams they will maintain only a constant relation to the arms and will cause both arms to have engagement with the respective cams at points of contact on opposite sides of a common line intersecting the axes of the cams and arms thereby locking the arms in position against rotation in any direction of movement, a third arm located between the other two arms, and the cams having surfaces shaped so that the third arm and middle arm can function with respect to the cams upon opposite rotation of the cams in the same manner as the first two arms.

2. A control mechanism having a plurality of oscillatable cams, a pair of arms respectively engageable with said cams, one of said cams and arms having a neutral position and arranged so as to angularly shift the arms away from their neutral position upon adjustment of the cams, the cam surfaces having provision whereby upon further rotation of the cams they will maintain only a constant relation to the arms and will cause both arms to have engagement with the respective cams at points of contact on opposite sides of a common line intersecting the axes of the cams and arms thereby locking the arms in position against rotation in any direction of movement, the cam, other than the one having the neutralizing action, being adapted to positively actuate one of the arms to move the arms into their neutral position upon reverse rotation of the cams.

3. A control mechanism having a pair of oscillatable cams, one of said cams having a neutral position recess terminating in a surface concentric to the axis of rotation, the second cam having a relatively steep slope extending radially outward beyond the recess of the other cam, said steep slope terminating at its inner end in a surface concentric with the cam axis, and a pair of arms one of which is adapted to cooperate with the cam having the neutral recess and the other of which is adapted to cooperate with the cam having the steep surface, said cams and arms being so related that when the cams are adjusted away from their neutral position the arms have contact with the concentric portions of the cams and are locked against such surfaces by reason of the arms having engagement with the cams at points of contact located on opposite sides of a line intersecting the axis of the cams and lying between the arms.

HARRY W. LINK.